(12) United States Patent
Krishnaswamy et al.

(10) Patent No.: US 8,199,977 B2
(45) Date of Patent: Jun. 12, 2012

(54) SYSTEM AND METHOD FOR EXTRACTION OF FEATURES FROM A 3-D POINT CLOUD

(75) Inventors: Kailash Krishnaswamy, Little Canada, MN (US); Jan Lukas, Melnik (CZ); Ondrej Kotaba, Orlova (CZ)

(73) Assignee: Honeywell International Inc., Morristown, NJ (US)

( * ) Notice: Subject to any disclaimer, the term of this patent is extended or adjusted under 35 U.S.C. 154(b) by 61 days.

(21) Appl. No.: 12/775,865

(22) Filed: May 7, 2010

(65) Prior Publication Data

US 2011/0274343 A1    Nov. 10, 2011

(51) Int. Cl.
*G06K 9/00* (2006.01)

(52) U.S. Cl. ........ 382/106; 382/103; 382/107; 382/131; 382/153; 348/50; 348/E13.04; 345/589; 702/81

(58) Field of Classification Search ............ 382/103, 382/153, 307, 204, 107, 199, 131, 106; 348/50, 348/E13.04; 345/589; 702/81
See application file for complete search history.

(56) References Cited

U.S. PATENT DOCUMENTS

| | | | |
|---|---|---|---|
| 4,891,630 A | 1/1990 | Friedman et al. | |
| 5,383,013 A | 1/1995 | Cox | |
| 5,870,490 A | 2/1999 | Takahashi et al. | |
| 5,978,504 A | 11/1999 | Leger | |
| 5,988,862 A | 11/1999 | Kacyra et al. | |
| 6,307,959 B1 | 10/2001 | Mandelbaum | |
| 6,704,621 B1 | 3/2004 | Stein et al. | |
| 6,724,383 B1 | 4/2004 | Herken et al. | |
| 6,771,840 B1* | 8/2004 | Ioannou et al. | 382/285 |
| 6,911,995 B2 | 6/2005 | Ivanov et al. | |
| 7,065,461 B2* | 6/2006 | Chang et al. | 702/81 |
| 7,203,342 B2 | 4/2007 | Pedersen | |
| 7,215,810 B2 | 5/2007 | Kaufmann et al. | |
| 7,239,751 B1 | 7/2007 | Amador | |
| 7,605,817 B2* | 10/2009 | Zhang et al. | 345/473 |
| 7,639,896 B2 | 12/2009 | Sun et al. | |
| 7,643,966 B2 | 1/2010 | Adachi et al. | |
| 7,956,862 B2* | 6/2011 | Zhang et al. | 345/473 |

(Continued)

FOREIGN PATENT DOCUMENTS

EP    1780678    5/2007

(Continued)

OTHER PUBLICATIONS

Schnabel et al.,(hereafter Schnabel), "Efficient RANSAC for Point-Cloud Shape Detection", Computer Graphics forum, vol. 26, 2007, pp. 214-226.*

(Continued)

*Primary Examiner* — Brian Q Le
*Assistant Examiner* — Mekonen Bekele
(74) *Attorney, Agent, or Firm* — Fogg & Powers LLC

(57) ABSTRACT

A method of extracting a feature from a point cloud comprises receiving a three-dimensional (3-D) point cloud representing objects in a scene, the 3-D point cloud containing a plurality of data points; generating a plurality of hypothetical features based on data points in the 3-D point cloud, wherein the data points corresponding to each hypothetical feature are inlier data points for the respective hypothetical feature; and selecting the hypothetical feature having the most inlier data points as representative of an object in the scene.

17 Claims, 5 Drawing Sheets

U.S. PATENT DOCUMENTS

| | | | |
|---|---|---|---|
| 2003/0067461 A1 | 4/2003 | Fletcher et al. | |
| 2004/0183905 A1 | 9/2004 | Comaniciu et al. | |
| 2004/0234136 A1 | 11/2004 | Zhu et al. | |
| 2005/0114059 A1* | 5/2005 | Chang et al. | 702/84 |
| 2006/0221072 A1 | 10/2006 | Se et al. | |
| 2006/0256114 A1 | 11/2006 | Nielsen et al. | |
| 2007/0217682 A1 | 9/2007 | Motomura et al. | |
| 2007/0234230 A1 | 10/2007 | Pedersen | |
| 2007/0285217 A1 | 12/2007 | Ishikawa et al. | |
| 2008/0013836 A1 | 1/2008 | Nakamura et al. | |
| 2008/0096152 A1* | 4/2008 | Cheang | 433/24 |
| 2010/0053191 A1* | 3/2010 | Chang et al. | 345/589 |
| 2010/0074473 A1 | 3/2010 | Kotaba | |
| 2010/0104199 A1 | 4/2010 | Zhang et al. | |
| 2010/0111370 A1 | 5/2010 | Black et al. | |
| 2010/0284572 A1 | 11/2010 | Lukas et al. | |

FOREIGN PATENT DOCUMENTS

| | | |
|---|---|---|
| EP | 2026279 | 2/2009 |
| EP | 2166375 | 3/2010 |
| EP | 2249311 | 11/2010 |
| GB | 2405776 | 3/2005 |
| JP | 11325833 | 11/1999 |
| WO | 0108098 | 2/2001 |
| WO | 2007056768 | 5/2007 |

OTHER PUBLICATIONS

Pauly et al., "Uncertainty and Variability in Point Cloud Surface Data", Eurographics Symposium on Point-Based Graphics (2004), pp. 8.*

Schnabel et al.,(hereafter Schnabel), "Efficient RANSAC for Point-Cloud Shape Detection", Computer Graphics forum, vol. 2007, pp. 214-226.*

Pauly et al., "Uncertainty and Variability in Point Cloud Surface Data", Eurographics Symposium on Point-Based Graphics (20041. Daaes 8.*

Barnat, J. et al., "Distributed LTL Model-Checking in SPIN", "International Workshop on SPIN Model Checking ", 2001, pp. 200-216, Publisher: Springer-Verlag New York, Inc.

Bosnacki, D. et al., "Symmetric Spin", "Lecture Notes in Computer Science", 2000, pp. 1-19, No. 1885, Publisher: Springer-Verlag.

Bosnacki et al., "A Heuristic for Symmetry Reductions with Scalarsets", "Proc. Int. Symp. Formal Methods for Increasing Sofware Productivity", 2001, pp. 518-533, Publisher: Lecture Notes in Computer Science.

Brim, L. et al., "Distributed LTL Model Checking Based on Negative Cycle Detection", "Lecture Notes in Computer Science", 2001, pp. 96-107, vol. 2245, Publisher: Springer-Verlag.

Hendriks, M. et al., "Adding Symmetry Reduction to UPPAAL", "Lecture Notes in Computer Science", 2004, pp. 46-59, vol. 2791, Publisher: Springer Berlin.

Iosif, Radu, "Symmetry Reduction Criteria for Software Model Checking", "Lecture Notes in Computer Science", 2002, pp. 22-41, vol. 2318, Publisher: Springer-Verlag.

Lerda, Flavio and Riccardo Sisto, "Distributed-Memory Model Checking with SPIN", "Lecture Notes in Computer Science", 1999, pp. 22-39, vol. 1680, Publisher: Springer-Verlag.

Lin, Chung-Chen and Rey-Jer You, "Planar Feature Extration from LIDAR Data Based on Tensot Analysis", "available at: http://www.aars-acrs.org/acrs/proceeding/ACRS2006/Papers/M-1_M5.pdf", 2006, Publisher: Asian Association on Remote Sensing.

Manku, G. et al., "Structural Symmetry and Model Checking", "Lecture Notes in Computer Science", 1998, pp. 159-171, vol. 1427, Publisher: Springer-Verlag.

Norris, C. and David L. Dill, "Better Verification Through Symmetry", "IFIP Transactions", 1993, pp. 97-111, vol. A-32, Publisher: North-Holland Publishing Co.

Rangarajan, M. et al., "Analysis of Distributed Spin Applied to Industrial-Scale Models", "Lecture Notes in Computer Science", Apr. 2004, vol. 2989, Publisher: Springer Verlag.

Stern, Urlich and David L. Dill, "Parallelizing the Mur Verifier", "Formal Methods in System Design", 2001, pp. 117-129, vol. 18, No. 2, Publisher: Kluwer Academic Publishers.

European Patent Office, "European Search Report", Aug. 2, 2011, Published in: EP.

Roncella, "Extraction of Planar Patches From Point Clouds to Retrieve Dip and Dip Direction of Rock Discontinuities", Sep. 12, 2005, pp. 162-167, vol. 3.

Schnabel, "Efficient RANSAC for Point-Cloud Shape Detection", "Computer Graphics Forum", Jun. 2007, pp. 214-226, vol. 26, No. 2, Publisher: Blackwell Publishing.

Yang, "Plane Detection in Point Cloud Data", Jan. 25, 2010, pp. 1-16.

Haag, "Implementation of a Flash-LADAR Aided Inertial Navigator", May 5, 2008, pp. 560-567, Publisher: IEEE.

Meier et al., "Object Detection and Tracking in Range Image Sequences by Separation of Image Features", "IEEE International Conference on Intelligent Vehicles", Oct. 1998, pp. 280-284.

Pfister, "Multi-scale Point and Line Range Data Algorithms for Mapping and Localization", "Proceedings of the 2006 IEEE International Conference on Robotics and Automation", May 15, 2006, pp. 1159-1166, Publisher: IEEE.

De La Puente, "Extraction of Geometrical Features in 3D Environments for Service Robotic Applications", Sep. 24, 2008, pp. 441-450, Publisher: Springer-Verlag Berlin.

Sagues et al, "Robust line matching in image pairs of scenes with dominant planes", "Optical Engineering", 2006, pp. 1-12, vol. 45, No. 6.

Steinhauser et al., "Motion Segmentation and Scene Classification from 3D LIDAR Data", "2008 IEEE Intellegent Vehicles Symposium", Jun. 4-6, 2008, pp. 398-403, Publisher: IEEE, Published in: Eindhoven, The Netherlands.

* cited by examiner

SYSTEM AND METHOD FOR EXTRACTION OF FEATURES FROM A 3-D POINT CLOUD

CROSS-REFERENCE TO RELATED APPLICATIONS

This application is related to the following co-pending United States patent applications, all of which are hereby incorporated herein by reference:

U.S. patent application Ser. No. 12/436,224 entitled "SYSTEMS AND METHODS FOR EXTRACTING PLANAR FEATURES, MATCHING THE PLANAR FEATURES, AND ESTIMATING MOTION FROM THE PLANAR FEATURES" filed on May 6, 2009 and which is referred to herein as the '224 application; and U.S. patent application Ser. No. 12/234,331 entitled "SYSTEM AND METHOD OF EXTRACTING PLANE FEATURES," filed on Sep. 19, 2008 and referred to herein as the '331 application.

U.S. patent application Ser. No. 12/644,559 entitled "SYSTEMS AND METHODS FOR MATCHING SCENES USING MUTUAL RELATIONS BETWEEN FEATURES," filed on Dec. 22, 2009 and referred to herein as the '559 application.

BACKGROUND

Typical vision-based navigation systems identify simple uniquely identifiable objects (commonly referred to as features) in a two-dimensional (2-D) image (typically an intensity image acquired by electro-optical cameras). These features and their position within the image are used for further processing, such as more complex object detection or motion estimation.

SUMMARY

In one embodiment, a method of extracting a feature from a point cloud is provided. The method comprises receiving a three-dimensional (3-D) point cloud representing objects in a scene, the 3-D point cloud containing a plurality of data points; generating a plurality of hypothetical features based on data points in the 3-D point cloud, wherein the data points corresponding to each hypothetical feature are inlier data points for the respective hypothetical feature; and selecting the hypothetical feature having the most inlier data points as representative of an object in the scene.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
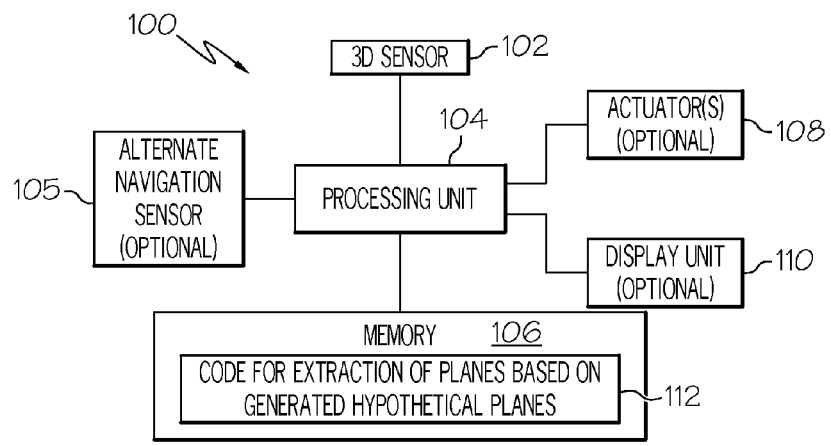
FIG. 1 is a block diagram of an exemplary embodiment of a system for extraction of planes.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

FIG. 1 is a high level block diagram depicting one embodiment of a system 100 for extracting and matching planar features, and for determining motion from the planar features. In this embodiment, system 100 is a navigation system component. In other embodiments, system 100 is configured in a different manner and/or with different components. Here, system 100 includes a sensor 102 coupled to a processing unit 104. Sensor 102 is operable to provide three-dimensional (3-D) data points which represent a scene to processing unit 104. As used herein, the term "scene" refers to a view of an area at a given moment in time. In addition, as used herein the terms "plane" and "planar feature" are used interchangeably.

In this exemplary embodiment, the data points collected by sensor 102 comprise a three dimensional (3D) point cloud. In one embodiment, sensor 102 is a 3D scanning or flash LiDAR camera such as the Swissranger SR-3100 manufactured by Mesa Imaging AG. In another embodiment, sensor 102 is a 3D scanning rotating LiDAR, such as LiDAR manufactured by the Velodyne corporation. In yet another embodiment, sensor 102 is a radar sensor (e.g. a millimeter wave radar or weather radar). In yet another embodiment, sensor 102 comprises a combination of radar and an electro-optical camera. In other embodiments, other combinations of sensors are used. In other embodiments, the 3D point-cloud is generated from data gathered over time or along a motion trajectory using sensors such as, but not limited to, sonar sensors, laser or radar altimeters, or sensors used for surveying methods, bathymetry, radar topography, structure from motion methods, or interferometry.

Processing unit 104 uses the 3D data points provided by sensor 102 to identify planar features in the scene. A planar feature has the appearance of a geometric plane and is defined by a set of points. In other words, if all the points in a set x satisfy the geometric equation of a plane within some small margin or threshold t, as shown in equation 1 below, then the set of points x defines a planar feature.

$$|n^Tx - d| \leq t,  \quad \text{Eq. 1}$$

where n is the normal vector of the planar feature and d is the orthogonal distance from the planar feature to the origin. The normal vector n and the orthogonal distance d can be estimated from the set of points. The points in the set of points which define a planar feature are also referred to herein as inliers or inlier data points. Similarly, the points which do not meet the above criteria for a given planar feature are referred to as outliers. The planar features typically correspond to real world planes on objects within a scene. For example, planar features may correspond to a top of a table, a side of a box, or a wall of a room, etc.

It should also be noted that, in some implementations, sensor(s) 102 provide range data in spherical coordinates (i.e. a horizontal angle, a vertical angle, and a distance). The spherical coordinates are converted to Cartesian coordinates, either by the sensor 102 itself or by processing unit 104. In an alternative embodiment, the calculations that follow are adapted to spherical coordinates. In other embodiments, the approach described below is generalized to operate on data using other mathematical representations of the input data. Using other mathematical representations of the input data enables extraction of features other than Cartesian planes, such as various two-dimensional manifold shapes. Thus, the description of the Cartesian coordinate space is provided by way of example and is not to be taken as limiting the scope of the present application. It should also be noted that the calculations presented herein can be modified to extract other geometrical two-dimensional manifolds which can be expressed, for example, by the mathematical equation $f(x, \theta) \leq t$, where x denotes points, θ denotes a set of geometrical parameters that can be estimated, and $f$ is a function. In the case of planar features described herein, the equation is expressed as $f(x, \theta) = |n'x-d|$, and $\theta = \{n, d\}$. For an exemplary case of spherical features, the equation can be expressed as $f(x, \theta) = |(x-a)'(x-a)-r^2|$ and $\theta = \{a, r\}$. Thus, the mathematical equation $f(x, \theta) \leq t$, is the generalized equation for determining the point-to-feature distance of each point, where each point whose point-to-feature distance is less than or equal to the threshold is identified as an inlier data point of that feature. As used herein the term "feature" is used to refer to planes and other two-dimensional manifolds such as spherical features. It is to be understood that the description below regarding planar features can also be adapted to other features, such as spherical features.

Furthermore, in this exemplary embodiment, processing unit 104 estimates motion by matching extracted planar features from the current scene to the corresponding planar features in a previous scene stored in the memory 106. For example, in some embodiments, processing unit 104 uses techniques such as, but not limited to, Scale-invariant feature transform (SIFT), Speeded Up Robust Features (SURF), or other matching techniques as known to one of skill in the art. In addition, in some embodiments, the techniques described in the '559 application are used to match extracted planar features. Hence, in this embodiment, processing unit 104 utilizes the planar features for visual odometry. However, in other embodiments, processing unit 104 is operable to use the planar features for other navigation tasks, such as, but not limited to, integration of the observed scenes with map data to minimize misalignment of map data to the real world, and automatic map construction based on the observed scenes.

Additionally, in this embodiment, system 100 includes a display unit 110 and one or more actuators 108. However, it is to be understood that, in other embodiments, one or both of display unit 110 and actuators 108 are omitted. Display unit 110 is operable to display navigation data to a user. For example, if the planar features are used to estimate motion, the calculated position and orientation of system 100 is displayed to the user. Alternatively, if the planar features are used for map generation, the generated map is displayed to the user. Suitable display units include, but are not limited to, various CRT, active and passive matrix LCD, and plasma display units.

In some embodiments, processing unit 104 uses the estimated motion calculation to determine the necessary actions to take in order to reach a programmed destination and/or avoid obstacles. In some such embodiments, processing unit 104 generates control signals which are sent to actuators 108 to control the movement of a vehicle in which system 100 is located. For example, processing unit 104 can control the motion of an unmanned vehicle based on control signals transmitted to movement actuators (such as the brakes, accelerator, etc.) in the unmanned vehicle. In other embodiments, the estimated motion calculation is used for fusion with data from other sensors, such as alternate navigation sensor 105, in order to achieve improved reliability and/or accuracy. For example, alternate navigation sensor 105 can be implemented as, but is not limited to, an inertial measurement unit (IMU), inertial navigation system (INS), attitude and heading reference system (AHRS), or other type of navigation system.

To identify and extract planar features from the 3D data points received from sensor 102, processing unit 104 executes code 112 stored in the memory 106. In particular, code 112 causes the processing unit 104 to execute one or more of the methods described in more detail below with respect to FIGS. 2-5. Processing unit 104 includes functions with software programs, firmware or other computer readable instructions for carrying out various methods, process tasks, calculations, and control functions, used, for example, in the extraction of planar features.

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link. In addition, in some embodiments, the processing unit 104 is implemented as a Field-Programmable Gate Array (FPGA) containing an equivalent representation of the computer readable instructions.

Figure 2:
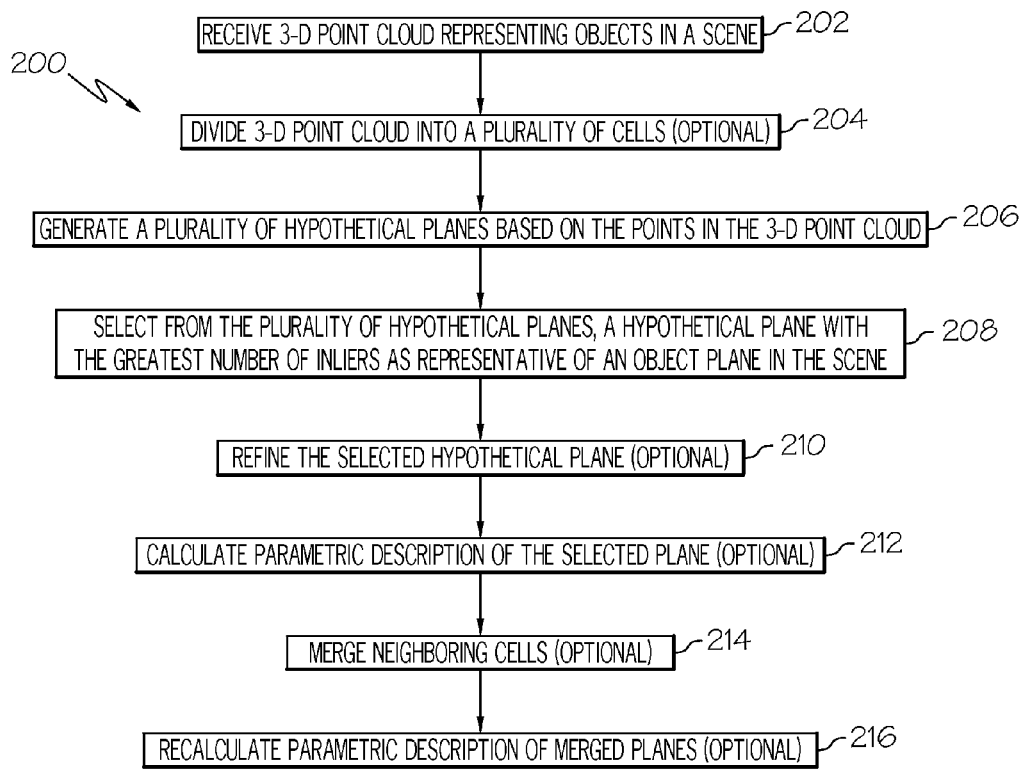
FIG. 2 is a flow chart depicting an exemplary embodiment of a method of extracting a plane.

FIG. 2 is a flow chart depicting an exemplary embodiment of a method 200 of extracting a plane. To extract multiple planes, method 200 is repeated for each extracted plane. At block 202, a 3-D point cloud representing objects in a scene is received. In some embodiments, the 3-D point cloud is divided into a plurality of cells, at block 204. For example, in some implementations, the processing time of the feature extraction can be improved by dividing the point cloud into cells and processing the cells in parallel with separate processors. In other embodiments, the received 3-D point cloud is not divided into cells and the entire data-set is processed as a single cell.

At block 206, a plurality of hypothetical planes is generated based on the points in the 3-D point cloud. When the 3-D point cloud is divided into cells, a plurality of hypothetical planes is generated for each cell based on the points within the respective cell. Exemplary methods of generating each of the plurality of hypothetical planes are described in more detail in FIGS. 3A and 3B. Each hypothetical plane is characterized by its geometrical parameters, particularly by the normal vector n and the orthogonal distance d of the respective plane.

At block 208, one of the plurality of hypothetical planes is selected as representative of a plane of an object in the scene. In particular, the selected hypothetical plane is the plane which provides a value of a quality function that is closer to a desired value than the non-selected hypothetical planes. A quality function, as used herein, is defined as a function whose value assess the goodness (or the quality) of a candidate or hypothetical feature. It should be noted that an explicit comparison with a desired value is not required in some embodiments.

For example, in the embodiment of FIG. 2, the quality function is a function of the number of inliers in each plane. Hence, the desired value can be considered the largest number of inliers available from the calculated hypothetical planes and is not a specific value. Alternatively, the desired value in this example can be considered a value approaching infinity. In either case, in this embodiment, the hypothetical plane with the greatest number of inliers provides a value of a quality function that is closest to the desired value and is selected as representative of a plane of an object in the scene. Thus, in some embodiments, the quality function is characterized as a local maximization/minimization problem for the respective cell. In such embodiments, the desired value is the local maximum/minimum value provided by the hypothetical planes.

It is to be understood that other quality functions can be used in other embodiments. Other exemplary quality functions include, but are not limited to, a function of the variance of inliers-to-plane distance and a function of the plane point density. For example, the function of the plane point density can be expressed as $-|iv-plane\ point\ density|$, where iv is a desired value and the plane point density is the number of inliers divided by the estimated plane size. In such embodiments, an explicit comparison is made through the quality function. Thus, variations of different quality functions can be implemented in different embodiments.

Having a hypothetical plane with parameters n (the normal vector) and d (the orthogonal distance), the number of inliers is calculated as the number of points x within the cell (or within the entire point cloud, if no cell splitting was performed), that satisfy equation 1 described above, for a given (e.g. user-specified) margin or threshold t. In one embodiment, the margin is selected to be t=0.1 m. The equation 1 described above determines the point-to-plane distance for each point. If the point-to-plane distance for a given point is less than the threshold value, 0.1 m in this example, then that point is included in the set of inlier data points x.

At block 210, the selected plane is optionally refined to improve the estimate of the planar feature. Exemplary methods of refining the selected plane are described in more detail with respect to FIGS. 4 and 5.

At block 212, the parametric description of the extracted plane is optionally computed. For example, for further processing, such as matching planar features between scenes, it might not be feasible to use the inliers of the plane directly due to computational and memory demands. Hence, in some implementations, the selected plane is described by the normal vector and orthogonal distance, in addition to other parameters such as the mean point (also referred to as centroid), to reduce the data size. For the mean point, all the points on the plane are used to compute the arithmetic mean. Also, since the inliers are a set of points, a 3-D covariance of those points and additional parameters such as the number of points can also be used as parameters to describe the plane. The parametric description is then used to determine if a match is found in another scene. In this way, the computational and memory demands are reduced compared to using the full set of inliers directly.

At block 214, if the received point cloud is divided into cells, selected planes from neighboring cells are optionally merged together. In particular, if the respective normal vectors and orthogonal distances to the origin of the selected planes are within a predetermined or adaptively determined merge threshold of each other, the selected planes are determined to belong to the same plane and are merged together. In other embodiments, plane parameters other than the normal vector and the orthogonal distance from origin are used, including but not limited to the laser return intensity, the variation in the laser return intensity, the planes' centroid-to-plane distances, polarization, principal moments, and/or others.

At block 216, a parametric description of the merged plane is optionally recalculated after merging. In some embodiments, the parametric description is recalculated based solely on the parametric description of the respective planes before they were merged together, thus reducing the computational and memory demands in comparison to using the full set of inliers directly. In some embodiments, the parametric description is recalculated immediately when any planes are merged together.

It is to be understood that blocks 206 to 212 can be repeated to select a plurality of planes. For example, in some embodiments, blocks 206 to 212 are repeated until all the points in the point cloud or respective cell are determined to be part of a plane or until a maximum defined number of iterations have been performed. In some embodiments, each iteration is performed on the set of data points reduced by the number of data points already identified as inliers of a plane in previous iterations. In other embodiments, all the input point are used in the successive iterations and additional logic is used to ensure the solutions' uniqueness, such as, but not limited to, filtration of the hypotheses generated in the block 206 to be non-repeating. In addition, whereas in this example, only one plane is selected at block 208, in other implementations multiple hypothetical planes may be selected. For example, each hypothetical plane having more than a threshold number of inliers is selected in some embodiments. Similarly, in some embodiments, each hypothetical plane having less than a threshold number of inliers is discarded. In some embodiments, the threshold varies with plane parameters. For example, in some embodiments, a smaller threshold is used for a plane having a centroid farther from the coordinates' origin than for a plane closer to the coordinates' origin.

Figure 3A:
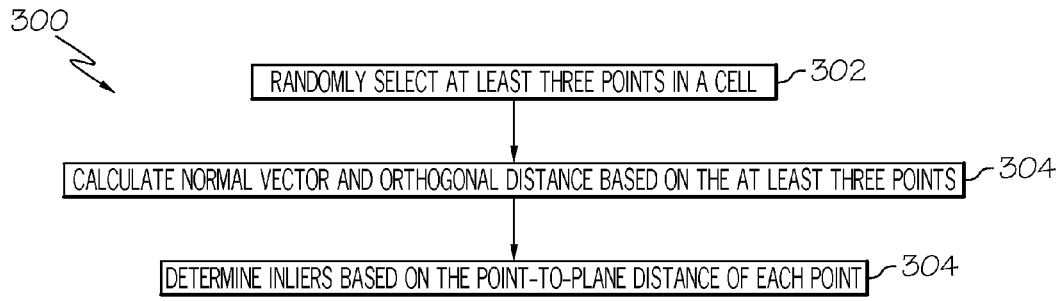
FIG. 3A is a flow chart depicting an exemplary embodiment of a method of calculating a hypothetical plane.

FIG. 3A is a flow chart depicting an exemplary embodiment of a method 300 of calculating a hypothetical plane. Method 300 is repeated to calculate each of the plurality of hypothetical planes that are generated at block 206 in method 200 above. At block 302, at least three random points are selected to define the hypothetical plane. For example, in one embodiment, the three random points are selected independently of one another. At block 304, the normal vector and the orthogonal distance of the hypothetical plane is calculated. For example, commonly known mathematical methods, such as least squares fit or estimate, are used in some embodiments to calculate the normal vector and the orthogonal distance. At block 306, the inlier data point are determined based on the point-to-plane distance of each data point. The point-to-plane distance for each point is calculated using the calculated normal vector and orthogonal distance. If the point-to-plane distance is greater than or equal to a threshold, the respective data point is identified as an inlier.

Figure 3B:
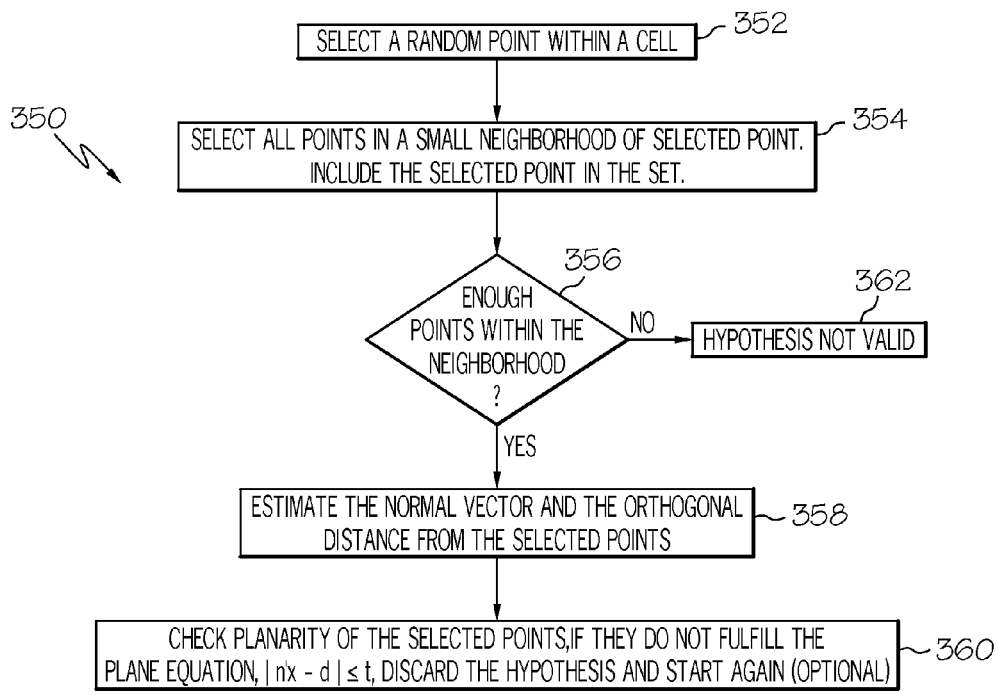
FIG. 3B is a flow chart depicting another exemplary embodiment of a method of calculating a hypothetical plane.

FIG. 3B is a flow chart depicting an exemplary embodiment of a method 350. Method 350 is an alternative to method 300 for calculating a hypothetical plane. Method 350 is repeated to calculate each of the plurality of hypothetical planes that are generated at block 206 in method 200 above. In method 350 it is assumed that there is some structure in the 3-D point cloud such that a neighborhood of any point within the point cloud can be selected efficiently. Point clouds acquired by some scanning LiDARs typically posses this property as well as 3-D images acquired by, for example, flash LiDARs. In one embodiment, such neighborhood may have a form of 2-D neighborhood in the range image provided by flash LiDAR. In another embodiment, for example for Velodyne scanning LiDAR, such neighborhood may have a form of points scanned by adjacent lasers within a narrow azimuth interval. In yet another embodiment, such neighborhood might be a standard geometric neighborhood in 3-D topology induced by $L_2$ norm in 3-D. In other embodiments, other forms of neighborhoods are used.

In method 300 above, a plane has to cover a substantial part of the cell to get a reasonably high probability of the three randomly selected points belonging to the same plane. However, the method 350 only assumes that a plane is at least a partially continuous structure and if a randomly select point belongs to the plane, its small neighborhood belongs there, too. The method 350 starts with block 352, when a random point within a cell is selected. At block 354, a small neighborhood around the selected point is taken. In one embodiment, for Velodyne LiDAR, 6 adjacent lasers and 1.2° azimuth span for the neighborhood is used. In other embodiments, different neighborhood sizes are used.

At block 356, it is determined whether there are enough points within the neighborhood. In particular, in this embodiment, it is determined if the number of points is greater or equal to a given threshold. The given threshold is set to at least 3, since 3 points are needed to define a plane. In one embodiment, half of the expected points within the neighborhood are used as the threshold. The number of expected points can be determined from sensor characteristics. If the number of points is below the threshold the hypothesis is considered to be invalid at block 362 and another hypothesis may be generated.

If the number of points is greater than or equal to the threshold, method 350 continues at block 358. At block 358, the normal vector and the orthogonal distance of the hypothetical plane is estimated from all the points within the selected neighborhood. As described above, any commonly known mathematical estimator, such as a least squares estimator, can be used to estimate the normal vector and the orthogonal distance of the hypothetical plane.

At block 360, all the points within the selected neighborhood are optionally examined to determine whether they form a plane-like structure. In particular, the normal vector n and the orthogonal distance d, estimated at block 358, are used to determine how many points x within the neighborhood of points used to estimate n and d satisfy the plane constraint $|n'x-d| \leq t$. In one embodiment, the threshold is set to $t=0.05$ m. In one embodiment, 80% of points x within the neighborhood need to satisfy the constraint, otherwise the hypothesis is declared to be invalid.

Figure 4:
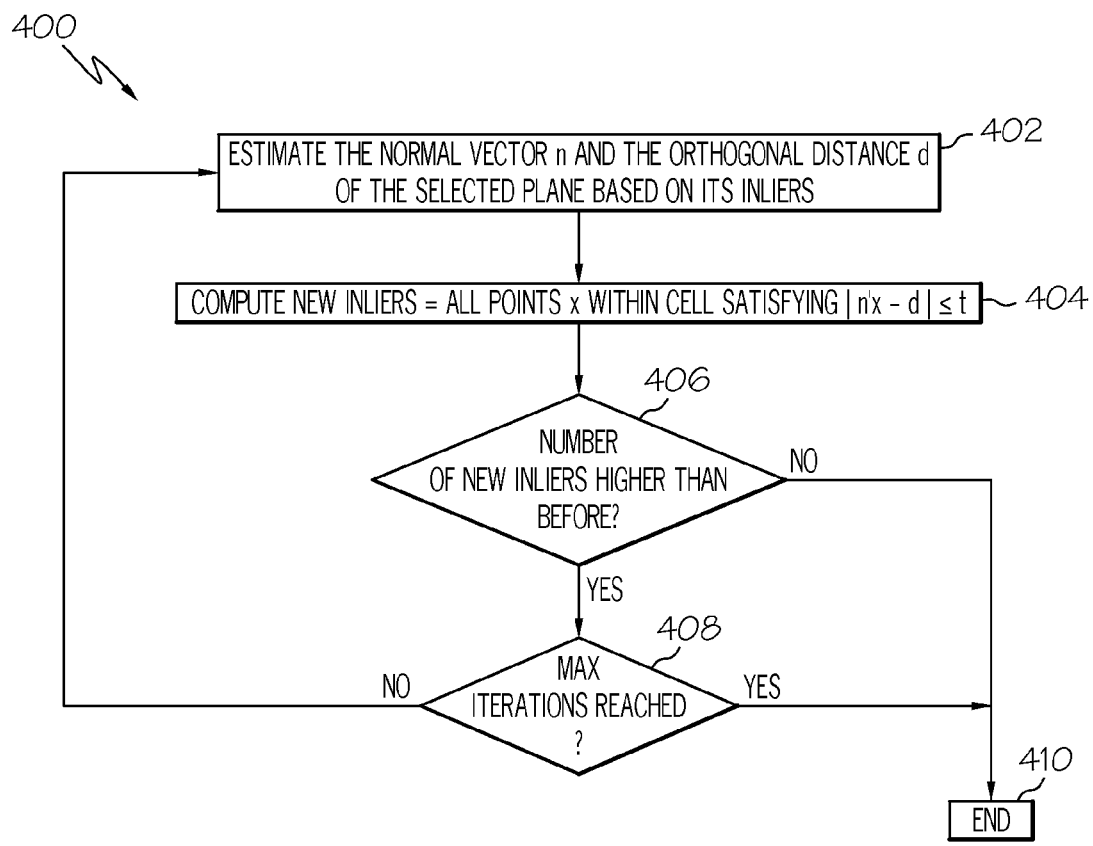
FIG. 4 is a flow chart depicting an exemplary embodiment of a method of refining a calculation of a plane.

FIG. 4 is a flow chart depicting an exemplary embodiment of a method 400 of refining a calculation of a plane. Method 400 can be implemented for example, at block 210 of method 200 above. At block 402, the normal vector n and orthogonal distance d of the selected plane is recalculated based on the initial inliers identified (e.g. the inliers identified at block 208 of method 200). In one embodiment, a least squares estimator is used to calculate the normal vector and the orthogonal distance. In other embodiments, different mathematical estimators are used.

At block 404, a new set of inliers is determined as all points x within the cell that satisfy equation 1 above. At block 406, it is determined if the number of inliers increased. For example, in some embodiments, method 400 is repeated until no new inliers are found. If the number of inliers increased, method 400 continues at block 408 where a check is performed to determine whether a maximum number of iterations has been reached. In one embodiment, only a single iteration through the cycle is used. In other embodiments, higher numbers of iterations are used. If the maximum number of iterations has not been reached, the method continues at block 402. If the maximum number of iterations has been reached, method 400 ends at block 410. In yet another embodiment, a different metric is calculated and the refinement is repeated until there is no improvement of the respective metric.

Figure 5A:
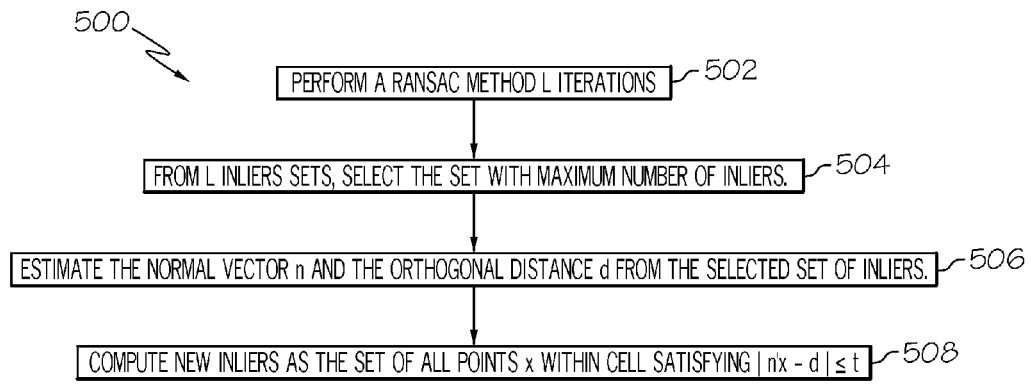
FIG. 5A is a flow chart depicting an exemplary embodiment of a Random SAmple Consensus (RANSAC) method of refining a calculation of a plane.

FIG. 5A is a flow chart depicting an exemplary embodiment of a RANdom SAmple Consensus (RANSAC) method 500 of refining a calculation of a hypothetical plane. At block 502, an implementation of a method 550 of determining a set of inliers is performed a given number of iterations, L. An exemplary implementation of the method 550 is described in FIG. 5B. In one embodiment, the number of iterations, L, is 200. In other embodiments, other values of L are used.

When L iterations of method 550 have been performed, the method 500 continues by selecting from L sets of inliers the set with highest number of inliers, at block 504. In one embodiment, when multiple sets have the same highest number of inliers, the first set with the highest number of inliers is selected. In other embodiments, different selection criterions are employed.

At block 506, the normal vector and orthogonal distance are again estimated from the selected highest-number-of-inliers set. After updating the normal vector and the orthogonal distance, the final inliers are determined as a set of points x within the cell, which satisfy the equation 1 described above, at block 508, where the method 500 ends.

Figure 5B:
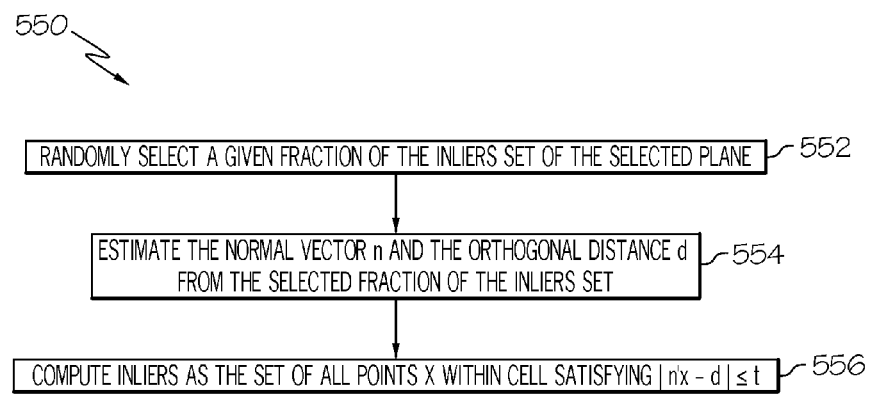
FIG. 5B is a flow chart depicting an exemplary implementation of a method of determining a set of inliers.

FIG. 5B is a flow chart depicting an exemplary implementation of the method 550 of determining a set of inliers. At block 552, a subset of the original set of inliers is randomly selected. For example, in some embodiments, ⅓ of the original set of inliers is randomly selected. At block 554, the normal vector n and orthogonal distance d of the hypothetical plane is updated based on the fraction of the original set of inliers selected at block 552. The method 550 ends at block 556, where a new inliers set is determined as a set of points x within the cell, which satisfy the equation 1 described above.

Figure 6:
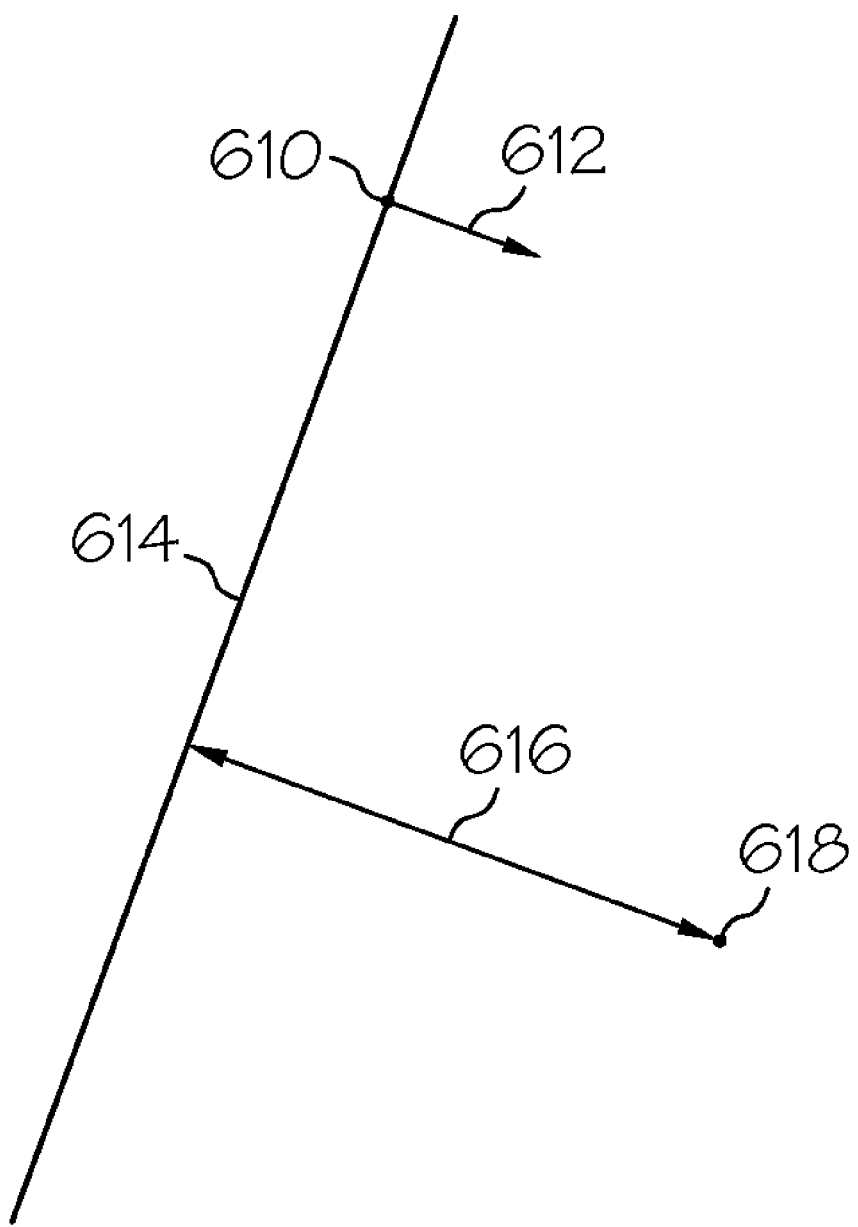
FIG. 6 depicts a geometric representation of a plane by the normal vector and the orthogonal distance from the coordinate origin.

FIG. 6 illustrates a geometrical meaning of the normal vector and the orthogonal distance. As shown, a data point 610 lies on the plane 614 having the normal vector 612. FIG. 6 illustrates an orthogonal view of plane 614, thus, plane 614 appears as a line. The orthogonal distance from plane 614 to coordinate origin 618 is the shortest distance 616 between them.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method of extracting a feature from a point cloud, the method comprising:
  receiving a three-dimensional (3-D) point cloud representing objects in a scene, the 3-D point cloud containing a plurality of data points;
  generating a plurality of hypothetical features based on data points in the 3-D point cloud, wherein the data points corresponding to each hypothetical feature are inlier data points for the respective hypothetical feature and the respective hypothetical feature has the appearance of a geometric two-dimensional manifold, wherein the plurality of hypothetical features are planar features and the geometrical parameters for each respective planar feature comprise a normal vector and an orthogonal distance from the respective planar feature to an origin; and
  selecting a hypothetical feature, which provides a value of a quality function that is closer to a desired value than the value of the quality function provided by the other hypothetical features, as representative of an object in the scene;
  calculating new inlier data points based on the geometrical parameters of a fraction of the inlier data points;
  wherein generating each of the plurality of hypothetical features comprises:
    selecting at least three data points;
    calculating geometrical parameters for the respective hypothetical feature based on the at least three data points; and
    using the calculated geometrical parameters to determine the point-to-feature distance for each data point, wherein each data point whose respective point-to-feature distance is less than or equal to a first threshold value is identified as an inlier data point.

2. The method of claim 1, wherein selecting the hypothetical feature that provides the value of the quality function that is closer to the desired value comprises selecting the hypothetical feature that has the greatest number of inlier data points.

3. The method of claim 1, further comprising:
  recalculating the geometrical parameters of the selected hypothetical feature based on all the inlier data points; and
  identifying additional data points as inlier data points of the selected hypothetical feature based on the recalculated geometrical parameters.

4. The method of claim 3, further comprising:
  determining if geometrical parameters of the selected hypothetical feature should be further recalculated based on the additional inlier data points; and
  if the geometrical parameters of the selected hypothetical feature are to be further recalculated:
    recalculating the geometrical parameters based on the additional inlier data points; and
    using the recalculated geometrical parameters to determine the point-to-feature distance for each data point not currently identified as an inlier data point, wherein each data point whose respective point-to-feature distance is less than or equal to the first threshold value is identified as an additional inlier data point.

5. The method of claim 1, wherein calculating new inlier data points comprises:
  calculating a plurality of updated hypothetical features based on the selected hypothetical feature;
  selecting the updated hypothetical feature that provides the value of the quality function that is closer to the desired value than the value of the quality function provided by the other updated hypothetical features; and
  recalculating the geometrical parameters of the selected updated hypothetical feature based on the additional inlier data points of the selected updated hypothetical feature;
  wherein calculating each of the plurality of updated hypothetical features comprises:
    randomly selecting a fraction of the inlier data points of the selected hypothetical feature;
    recalculating the geometrical parameters of the selected hypothetical feature based on the fraction of the inlier data points to describe the respective updated hypothetical feature; and
    using the recalculated geometrical parameters to determine the point-to feature distance for each data point not currently identified as an inlier data point, wherein each point whose respective point-to-feature distance is less than or equal to the first threshold value is identified as an additional inlier data point.

6. The method of claim 1, further comprising:
  dividing the received 3-D point cloud into a plurality of cells;
  wherein a plurality of hypothetical features are generated for each cell based on the data points in each respective cell and a hypothetical feature is selected from each cell.

7. The method of claim 6, further comprising:
  comparing the selected hypothetical feature from each cell with the selected hypothetical feature from neighboring cells; and
  if the results of the comparison are less than or equal to a merge threshold, merging the selected hypothetical features.

8. The method of claim 1, wherein selecting at least three data points further comprises:
  selecting a first random data point; and
  selecting data points in a neighborhood of the first random data point;
  wherein the geometrical parameters are calculated if the number of selected data points is equal to or greater than a second threshold.

9. The method of claim 1, wherein geometrical parameters are calculated using a least squares fit.

10. A system comprising:
  a sensor operable to obtain a set of three-dimensional (3-D) data points for a scene;
  a processing unit coupled to the sensor and operable to:
    generate a plurality of hypothetical features based on the plurality of data points, each hypothetical feature having a plurality of inlier data points and the appearance of a geometric two-dimensional manifold, wherein the plurality of hypothetical features are planar features and the geometrical parameters for each respective planar feature comprise a normal vector and an orthogonal distance from the respective planar feature to an origin;
    select the hypothetical feature that provides a value of a quality function that is closer to a desired value than the value of the quality function provided by the other hypothetical features; and
    calculate new inlier data points based on the geometrical parameters of a fraction of the plurality of inlier data points;

wherein the processing unit is further operable to generate each of the plurality of hypothetical features by:
  selecting at least three data points;
  calculating geometrical parameters for the respective hypothetical feature based on the at least three data points; and
  calculating a point-to-feature distance for each data point based on the calculated geometrical parameters, wherein each data point whose respective point-to-feature distance is less than or equal to a first threshold value is identified as an inlier data point.

11. The system of claim 10, wherein the processing unit is further operable to:
  recalculate the geometrical parameters of the selected hypothetical feature based on all the inlier data points;
  identify additional data points as inlier data points of the selected hypothetical feature based on the recalculated geometrical parameters;
  determine if the geometrical parameters of the selected hypothetical feature should be further recalculated based on the additional inlier data points; and
  if the geometrical parameters of the selected hypothetical feature are to be further recalculated:
    recalculate the geometrical parameters based on the additional inlier data points; and
    determine the point-to-feature distance for each data point not currently identified as an inlier data point using the recalculated geometrical parameters, wherein each point whose respective point-to-feature distance is less than or equal to the first threshold value is identified as an inlier data point.

12. The system of claim 10, wherein the processing unit is further operable to:
  calculate a plurality of updated hypothetical features based on the selected hypothetical feature;
  select the updated hypothetical feature that provides a value of a quality function that is closer to the desired value than the value of the quality function provided by the other updated hypothetical features; and
  recalculate the geometrical parameters of the selected updated hypothetical feature based on the additional inlier data points of the selected updated hypothetical feature;
  wherein the processing unit is operable to calculate each of the plurality of updated hypothetical features by:
    randomly selecting a fraction of the inliers of the selected hypothetical feature;
    recalculating the geometrical parameters of the selected hypothetical feature based on the fraction of the inliers to describe the respective updated hypothetical feature; and
    determining the point-to-feature distance for each data point not currently identified as an inlier data point using the recalculated geometrical parameters, wherein each point whose respective point-to-feature distance is less than or equal to the first threshold value is identified as an additional inlier data point.

13. The system of claim 10, wherein the processing unit is further operable to:
  divide the plurality of data points received from the sensor into a plurality of cells, each cell comprising a subset of the plurality of data points;
  generate a plurality of hypothetical features for each cell based on the subset of data points in each respective cell; and
  for each cell, select the hypothetical feature that provides a value of a quality function that is closer to the desired value than the value of the quality function provided by the other hypothetical features.

14. A program product comprising program instructions embodied on a non-transitory processor-readable medium for execution by a programmable processor, wherein the program instructions are operable to cause the programmable processor to:
  generate a plurality of hypothetical features based on a plurality of data points in a three-dimensional (3-D) point cloud received from a sensor, each hypothetical feature having a plurality of inlier data points and the appearance of a geometric two-dimensional manifold, wherein the plurality of hypothetical features are planar features and the geometrical parameters for each respective planar feature comprise a normal vector and an orthogonal distance from the respective planar feature to an origin;
  select the hypothetical feature that provides a value of a quality function that is closer to a desired value than the value of the quality function provided by the other hypothetical planes as representative of an object feature in a scene; and
  calculate new inlier data points based on the geometrical parameters of a fraction of the inlier data points;
  wherein the program instructions are operable to cause the programmable processor to generate each of the plurality of hypothetical features by causing the programmable processor to:
    select at least three data points;
    calculate geometrical parameters for the respective hypothetical feature based on the at least three data points; and
    calculate a point-to-feature distance for each data point based on the calculated geometrical parameters, wherein each data point whose respective point-to-feature distance is less than or equal to a first threshold value is identified as an inlier data point.

15. The program product of claim 14, wherein the program instructions are further operable to cause the programmable processor to:
  recalculate the geometrical parameters of the selected hypothetical feature based on all the inlier data points;
  identify additional data points as inlier data points of the selected hypothetical feature based on the recalculated geometrical parameters;
  determine if the geometrical parameters of the selected hypothetical feature should be further recalculated based on the additional inlier data points; and
  if the geometrical parameters of the selected hypothetical feature are to be further recalculated, the program instructions are further operable to cause the programmable processor to:
    recalculate the geometrcial parameters based on the additional inlier datapoints; and
    determine the point-to-feature distance for each data point not currently identified as an inlier data point using the recalculated geometrical parameters, wherein each data point whose respective point-to-feature distance is less than or equal to the first threshold value is identified as an additional inlier data point.

16. The program product of claim 14, wherein the program instructions are further operable to cause the programmable processor to:
  calculate a plurality of updated hypothetical features based on the selected hypothetical feature;

select the updated hypothetical feature that provides the value of the quality function that is closer to the desired value than the value of the quality function provided by the other updated hypothetical features; and recalculate the geometrical parameters of the selected updated hypothetical feature based on the additional inlier data points of the selected updated hypothetical feature;

wherein the program instructions are operable to cause the programmable processor to calculate each of the plurality of updated hypothetical features by causing the programmable processor to:

randomly select a fraction of the inliers of the selected hypothetical feature;

recalculate the geometrical parameters of the selected hypothetical feature based on the fraction of the inliers to describe the respective updated hypothetical feature; and determine the point-to-feature distance for each data point not currently identified as an inlier data point using the recalculated geometrical parameters, wherein each data point whose respective point-to-feature distance is less than or equal to the first threshold value is identified as an additional inlier data point.

17. The program product of claim 14, wherein the program instructions are further operable to cause the programmable processor to:

divide the plurality of data points received from the sensor into a plurality of cells, each cell comprising a subset of the plurality of data points;

generate a plurality of hypothetical features for each cell based on the subset of data points in each respective cell; and for each cell, select the hypothetical feature that provides a value of a quality function that is closer to a desired value than the value of the quality function provided by the other hypothetical features of the respective cell.

* * * * *